J. GRIFFIN.
Saw-Guide.
No. 209,807. Patented Nov. 12, 1878.
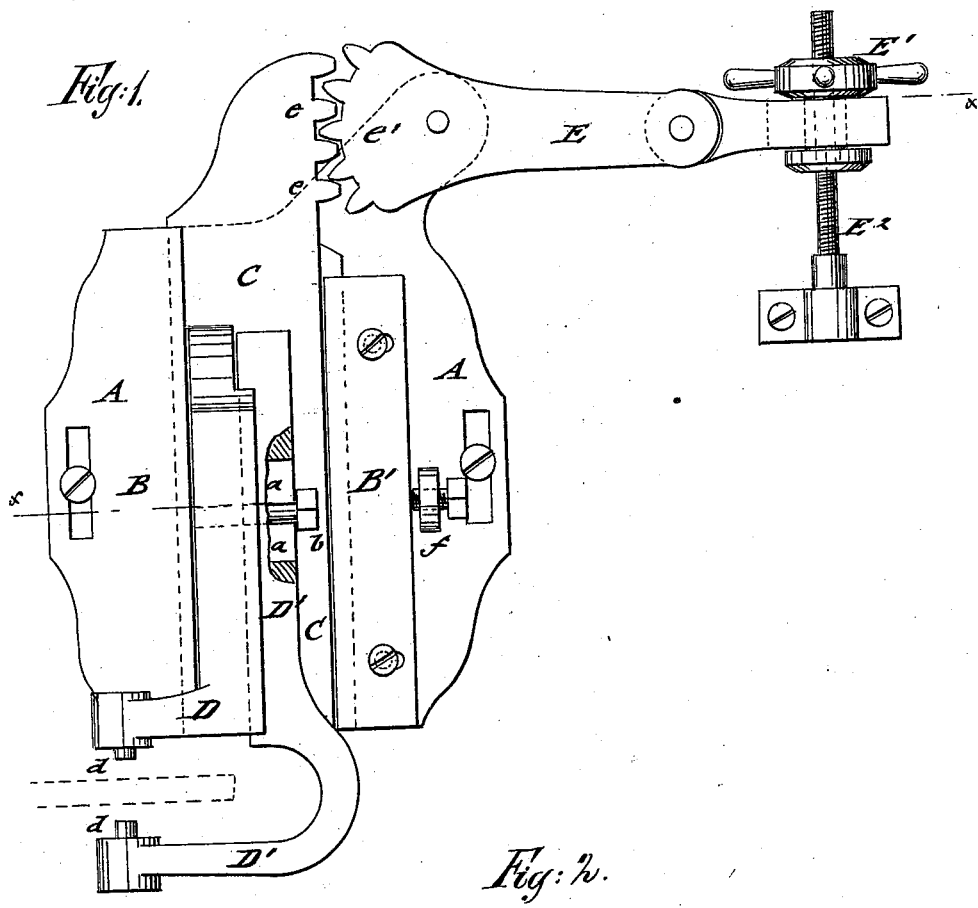
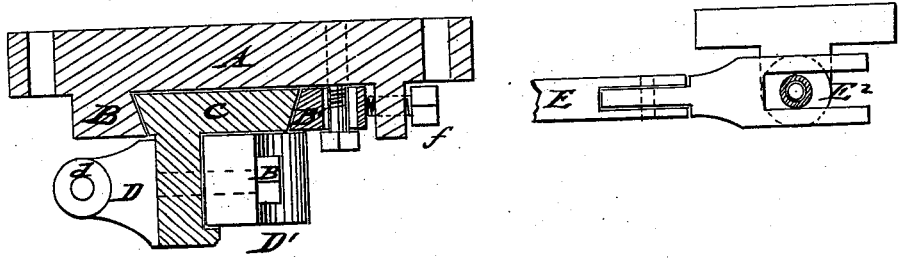
WITNESSES:
Chas. Nieta
C. Sedgwick
INVENTOR:
J. Griffin
BY Munn & Co.
ATTORNEYS.

UNITED STATES PATENT OFFICE.

JAMES GRIFFIN, OF MENDOCINO, CALIFORNIA.

IMPROVEMENT IN SAW-GUIDES.

Specification forming part of Letters Patent No. 209,807, dated November 12, 1878; application filed August 26, 1878.

*To all whom it may concern:*

Be it known that I, JAMES GRIFFIN, of Mendocino, in the county of Mendocino and State of California, have invented a new and Improved Saw-Guide, of which the following is a specification:

In the accompanying drawing, Figure 1 represents a top view of my improved saw-guide with part cut off; and Fig. 2 is a vertical transverse section of the same on line $xx$, Fig. 1.

Similar letters of reference indicate corresponding parts.

This invention has reference to an improved saw-guide, that may be adjusted by the operator when the saw is in the cut, which is of special advantage when sawing long timber, and by which the wear of the parts is taken up in easy manner, so as to keep the guide always in good working condition.

The invention will first be described in connection with the drawing, and then pointed out in the claims.

Referring to the drawings, A represents the bed-plate of my improved saw-guide, which is secured by slots and set-screws sidewise of the saw, so as to be adjusted nearer to or farther from the same.

Between a fixed guide-rail, B, and an adjustable guide-rail, B', of the bed-plate A is guided a slide-plate, C, which is provided at the end in proximity to the saw with a fixed angular arm or post, D, and with an adjustable curved arm, D', that is set into a guide-recess of the fixed arm, and adjusted laterally by a slot, $a$, and clamp-screw $b$ along the same.

The ends of the arms D D' are parallel to each other and to the saw, and provided with sockets for inserting the plugs $d$, that serve to guide the saw between them.

The opposite end of the slide-plate C is provided with rack-teeth $e$, that are engaged by a toothed segment, $e'$, at the end of a fulcrumed lever, E, which is connected by a pivoted and forked end piece with an adjusting screw-nut, E¹, and screw-bolt E², that is strapped at one end to the frame or bench to which the bed-plate A is attached.

When it is desired to set the studs to the saw the lever E and slide-plate C are moved by the screw-nut and bolt as far as required, and then the movable guide-rail B' of the bed-plate clamped tightly to the slide-plate C by the clamp-screw $f$, so as to retain the guide-studs firmly in their position toward the saw.

When the guide-studs are worn they may be readily set closer to the saw by adjusting the bed-plate and the movable arm D' of the slide-plate C, which keeps the studs in good working fit. The guide has also the advantage of being moved when the saw is in the cut, and of being adjusted at any time without any interruption of the work.

As the adjusting mechanism is at some distance from the saw, the guide may be adjusted without inconvenience to the operator.

All the parts of the guide are simple and durable in construction, and adjusted without any loss of motion, being directly and accurately set to the saw.

Having thus described my invention, I claim as new and desire to secure by Letters Patent—

1. In a saw-guide, the combination of a bed-plate having a fixed and a movable guide-rail with a laterally-adjustable slide-plate having a fixed and an adjustable guide arm or post for the saw, substantially as specified.

2. In a saw-guide, the combination of sliding and guided slide-plate, carrying the guide arms or posts for the saw, with a fulcrumed and jointed lever and intermeshing rack-gear and adjusting nut and bolt, substantially as set forth.

3. In a saw-guide, the combination of a bed-plate having a fixed and a movable guide-rail with a laterally-adjustable slide-plate having a fixed and an adjustable guide post or arm, the movable guide-rail being clamped to the slide-plate by clamp-screw $f$ after the guide-arms are adjusted to the saw, substantially as and for the purpose described.

JAMES GRIFFIN.

Witnesses:
JOHN J. MARSHALL,
WM. VALENTINE.